United States Patent [19]
Dean et al.

[11] Patent Number: 6,132,868
[45] Date of Patent: Oct. 17, 2000

[54] COPOLYESTER BINDER FIBERS

[75] Inventors: Leron R. Dean; William A. Haile; Richard L. McConnell, all of Kingsport, Tenn.

[73] Assignee: Eastman Chemical Company, Kingsport, Tenn.

[21] Appl. No.: 09/187,004

[22] Filed: Nov. 6, 1998

Related U.S. Application Data

[60] Provisional application No. 60/064,717, Nov. 6, 1997.

[51] Int. Cl.[7] .............................. D02G 3/00; C08G 63/78
[52] U.S. Cl. ......................... 428/364; 528/275; 528/279; 528/280; 528/286; 528/298; 528/302; 528/307; 528/308; 528/308.6; 524/706; 524/709; 524/783; 524/785; 428/480; 525/437; 525/445
[58] Field of Search ..................................... 528/279, 275, 528/280, 286, 298, 302, 307, 308, 308.6; 524/706, 779, 783, 785; 428/364, 480; 525/437, 445

[56] References Cited

U.S. PATENT DOCUMENTS

| Re. 32,765 | 10/1988 | Callander et al. ........................ 524/382 |
| 2,901,466 | 8/1959 | Kibler et al. ............................... 260/75 |
| 3,589,956 | 6/1971 | Kranz et al. ............................ 156/62.4 |
| 3,907,754 | 9/1975 | Tershansy et al. ........................ 260/75 |
| 3,962,189 | 6/1976 | Russin et al. ......................... 260/75 R |
| 4,010,145 | 3/1977 | Russin et al. ......................... 260/75 R |
| 4,093,603 | 6/1978 | Jackson, Jr. et al. ................. 260/75 R |
| 4,094,721 | 6/1978 | Sturm et al. ............................. 156/309 |
| 4,116,942 | 9/1978 | Weinberg et al. ...................... 528/283 |
| 4,189,338 | 2/1980 | Ejima et al. ............................. 156/167 |
| 4,217,426 | 8/1980 | McConnell et al. .................... 525/173 |
| 4,340,526 | 7/1982 | Petke et al. ............................. 524/292 |
| 4,356,299 | 10/1982 | Cholod et al. .......................... 528/279 |
| 4,419,507 | 12/1983 | Sublett ................................... 528/302 |
| 4,450,250 | 5/1984 | McConnell et al. .................... 524/141 |
| 4,468,490 | 8/1984 | Meyer, Jr. et al. ...................... 524/311 |
| 4,521,556 | 6/1985 | Adams et al. ............................. 524/88 |
| 4,540,749 | 9/1985 | Meyer, Jr. et al. ...................... 525/437 |
| 4,576,997 | 3/1986 | Trotter et al. ............................ 525/444 |
| 4,668,453 | 5/1987 | Ebnesajjad et al. ....................... 264/78 |
| 4,668,764 | 5/1987 | Satou .................................... 528/308 |
| 4,740,581 | 4/1988 | Pruett et al. ............................. 528/289 |
| 4,745,174 | 5/1988 | Pruett et al. ............................. 528/289 |
| 4,749,772 | 6/1988 | Weaver et al. ........................... 528/288 |
| 4,749,773 | 6/1988 | Weaver et al. ........................... 528/288 |
| 4,749,774 | 6/1988 | Weaver et al. ........................... 528/288 |
| 4,950,732 | 8/1990 | Weaver et al. ........................... 528/288 |
| 4,999,388 | 3/1991 | Okamoto ................................ 523/400 |
| 5,017,680 | 5/1991 | Sublett ................................... 528/274 |
| 5,057,561 | 10/1991 | Manica et al. ............................. 524/68 |
| 5,106,944 | 4/1992 | Sublett ................................... 528/279 |
| 5,166,311 | 11/1992 | Nichols .................................. 528/285 |
| 5,219,941 | 6/1993 | Meyer, Jr. et al. ...................... 525/173 |
| 5,252,699 | 10/1993 | Chamberlin et al. .................... 528/289 |
| 5,292,783 | 3/1994 | Buchanan et al. ......................... 524/37 |
| 5,312,797 | 5/1994 | Takiguchi et al. ....................... 503/227 |
| 5,340,907 | 8/1994 | Yau et al. ................................ 528/274 |
| 5,340,910 | 8/1994 | Chamberlin et al. .................... 528/289 |
| 5,348,699 | 9/1994 | Meyer et al. ......................... 264/176.1 |
| 5,372,864 | 12/1994 | Weaver et al. ......................... 428/36.92 |
| 5,384,377 | 1/1995 | Weaver et al. ........................... 525/437 |
| 5,385,773 | 1/1995 | Yau et al. ................................ 428/221 |
| 5,393,863 | 2/1995 | Yau et al. ............................. 528/308.4 |

(List continued on next page.)

FOREIGN PATENT DOCUMENTS

| 0 517 171 A2 | 12/1992 | European Pat. Off. . |
| 0 526 645 A1 | 2/1993 | European Pat. Off. . |
| 532 988 A1 | 3/1993 | European Pat. Off. . |
| 542 239 A1 | 5/1993 | European Pat. Off. . |
| 197 15 682 A1 | 10/1997 | Germany . |
| 505 9616 | 3/1993 | Japan . |
| 509 7985 | 4/1993 | Japan . |
| 08092816 | 4/1996 | Japan . |
| 824 5778 | 9/1996 | Japan . |
| 1047072 | 11/1966 | United Kingdom . |
| 1053374 | 12/1966 | United Kingdom . |
| 1344492 | 1/1974 | United Kingdom . |
| WO 84/02144 | 6/1984 | WIPO . |
| WO 96/15175 | 1/1996 | WIPO . |
| WO 96/15176 | 1/1996 | WIPO . |
| WO 96/04422 | 2/1996 | WIPO . |
| WO 96/15173 | 5/1996 | WIPO . |
| WO 96/15174 | 5/1996 | WIPO . |
| WO 96/25446 | 8/1996 | WIPO . |
| WO 96/25448 | 8/1996 | WIPO . |
| WO 98/12245 | 3/1998 | WIPO . |

OTHER PUBLICATIONS

"Improved Color Poly(ethylene/1,4–cyclohexylenedimethylene terephthalate)," Research Disclosure, No. 359, Mar. 1994, pp. 142–144.

R. Bass, "PCT and PETG Polyester Fibers for Nonwovens," INDA–TEC 96, Nonwovens Conference, 1996, pp. 19.1–19.9.

International Search Report, dated Apr. 8, 1999, in International Application No. PCT/US98/23599.

International Search Report, dated Feb. 2, 1999, in International Application No. PCT/US98/17813.

"Chemical Substances of Melty," Unitika Ltd., Product Brochure, Apr. 1993.

"Types of Bellcombi," Kanebo Ltd., Product Brochure.

"Textile Fibers Group Hoechst Celanese Corporation," Hoechst Celanese, Product Brochure.

Primary Examiner—Samuel A. Acquah
Attorney, Agent, or Firm—Rose M. Allen; Harry J. Gwinnell; Cheryl J. Tubach

[57] ABSTRACT

The invention relates to fibers, particularly binder fibers, made from copolyesters and the copolyesters themselves. The copolyesters of the invention are generally formed from 1,3- or 1,4-cyclohexanedimethanol, ethylene glycol and isophthalic acid or esters thereof and at least one dicarboxylic acid selected from terephthalic acid, naphthalenedicarboxylic acid, 1,3- or 1,4-cyclohexanedicarboxylic acid or esters thereof. Such copolyesters may be formed into a variety of products, especially binder fibers for nonwoven fabrics, textile and industrial yarns, and composites.

22 Claims, No Drawings

U.S. PATENT DOCUMENTS

| | | | |
|---|---|---|---|
| 5,393,871 | 2/1995 | Yau et al. | 528/308.4 |
| 5,446,079 | 8/1995 | Buchanan et al. | 524/41 |
| 5,453,479 | 9/1995 | Borman et al. | 528/279 |
| 5,559,171 | 9/1996 | Buchanan et al. | 524/41 |
| 5,563,236 | 10/1996 | Murata et al. | 528/295 |
| 5,580,911 | 12/1996 | Buchanan et al. | 524/41 |
| 5,599,858 | 2/1997 | Buchanan et al. | 524/41 |
| 5,608,031 | 3/1997 | Yau et al. | 528/281 |
| 5,643,991 | 7/1997 | Stipe et al. | 524/496 |
| 5,656,715 | 8/1997 | Dickerson et al. | 528/271 |
| 5,656,716 | 8/1997 | Schmidt et al. | 528/279 |
| 5,668,243 | 9/1997 | Yau et al. | 528/280 |
| 5,681,918 | 10/1997 | Adams et al. | 528/279 |
| 5,688,899 | 11/1997 | Strand et al. | 528/279 |
| 5,744,571 | 4/1998 | Hilbert et al. | 528/272 |
| 5,773,554 | 6/1998 | Dickerson et al. | 528/271 |
| 5,889,135 | 3/1999 | Warzelhan et al. | 528/17 |

COPOLYESTER BINDER FIBERS

PRIORITY DATA

This application claims benefit under 35 U.S.C. §119 of provisional application 60/064,717 filed Nov. 6, 1997, the disclosure of which is incorporated herein by reference in its entirety.

FIELD OF THE INVENTION

The invention relates to fibers, particularly binder fibers, made from copolyesters and the copolyesters themselves. The copolyesters of the invention are generally formed from 1,3- or 1,4-cyclohexanedimethanol, ethylene glycol and isophthalic acid or esters thereof and at least one dicarboxylic acid selected from terephthalic acid, naphthalenedicarboxylic acid, 1,3- or 1,4-cyclohexanedicarboxylic acid or esters thereof. Such copolyesters may be formed into a variety of products, especially binder fibers for nonwoven fabrics, textile and industrial yarns, and composites.

BACKGROUND OF THE INVENTION

Nonwoven fabrics are widely used in a variety of products. For example, nonwoven fabrics are suitable for use in filters, roofing materials, composites, backing materials, linings, insulation, medical/surgical applications, bedding, tablecloths, and diapers. High loft batting nonwoven fabrics are used in a wide variety of products, including comforters, robe wear, and bra cups. Generally nonwoven fabrics are based on polyester, acrylic, nylon, glass and cellulosic fibers which may be bonded with latex adhesives, binder fibers, or polymers in powder form. The bonding of nonwoven fabrics with binder fibers provides a convenient method for making nonwoven fabrics without the need for water-based adhesives which are less environmentally friendly. Nonwoven fabrics bonded with binder fibers are economical to produce, and provide a method for making articles, which are unique or superior in performance. Other applications are uses in yarns to increase strength or reduce pilling, and uses in prepregs, preforms and a wide range of composite structures.

Certain copolyesters have been found to be useful as binder fibers. For example, polyethylene terephthalate (PET) copolyesters containing 1,3- or 1,4-cyclohexanedimethanol having inherent viscosity (I.V.) values in the range of about 0.6 to about 0.8 have been used in the past as binder fibers to bond polyester or other fibers. Copolyesters with lower I.V. values, however, were believed to not have adequate bonding strength.

It is well known that copolyesters can be prepared by processes involving polyesterification and polycondensation. Generally, as described in U.S. Pat. Nos. 2,901,466, 5,017,680, 5,106,944, 5,668,243 and 5,668,243, the reactants include glycol components and dicarboxylic acid components. Typically, one dicarboxylic acid component is terephthalic acid and one dihydric alcohol is ethylene glycol. Such copolyesters are relatively inert, hydrophobic materials which are suitable for a wide variety of uses, including, molded articles, such as those used in the automobile and appliance industries, food trays, fibers, sheeting, films and containers, such as bottles. The use of ethylene glycol as the only diol, however, is accompanied by undesirable properties such as yellow discoloration and weak fiber binding properties. Indeed, such polymers tend to be opaque, crystalline polymers with high melting temperatures which make them unsuitable for use as binder fibers. To remedy the problems with polyethylene terephthalates, polyethylene terephthalate copolyesters have been formed with 1,4-cyclohexanedimethanol or isophthalic acid.

Previous attempts at forming copolyesters with 1,4-cyclohexanedimethanol have focused upon copolyesters having high inherent viscosities, I.V., of greater than 0.6, due to the belief that low inherent viscosities would not possess adequate strength. In particular, it was believed that low inherent viscosity copolyesters were unable to provide adequate bonding strength to form commercially acceptable binder fibers. Indeed, previous polyethylene terephthalate copolyesters containing 1,4-cyclohexanedimethanol were made with inherent viscosities ranging from 0.6 to 0.8 to form binder fibers to bond polyesters or other fibers. However, such attempts have not been entirely successful in providing copolyesters having the desired high clarity and hue or bonding capability at low activation temperatures when in the form of a binder fiber.

Other attempts at forming copolyesters suitable for use as binder fibers have focused on polyethylene terephthalate copolyesters which have been formed with isophthalic acid and diethylene glycol. Such attempts have resulted in unicomponent and bicomponent binder fibers sold as BELLCOMBI® available from Unitika of Osaka, Japan, MELTY® available from Kanebo, Ltd. of Osaka, Japan, CELBOND® available from Hoechst Celanese Corporation and the like. These products however, have failed to recognize the clarity, bonding temperature, bonding strength and cost benefits of forming copolyesters containing both isophthalic acid and 1,3- or 1,4-cyclohexanedimethanol.

There exists a need in the art for cost-effective copolyesters formed from 1,3- or 1,4-cyclohexanedimethanol, ethylene glycol, isophthalic acid and at least one dicarboxylic acid selected from terephthalic acid, naphthalenedicarboxylic acid, 1,3- or 1,4-cyclohexanedicarboxylic acid or esters thereof. Such copolyesters possess improved clarity and color as well as improved binder fiber bonding strength at low activation temperatures.

Additionally, copolyesters for binder fibers are described in Copending U.S. application Ser. No. 09/143,437 entitled "Copolymer Binder Fibers," filed on Aug. 28, 1998, the disclosure of which is incorporated by reference in its entirety. In this application a copolyester is generally formed from 1,4-cyclohexanedimethanol, ethylene glycol, and at least one dicarboxylic acid selected from terephthalic acid, naphthalenedicarboxylic acid, 1,4-cyclohexanedicarboxylic acid or esters thereof. Other additional dicarboxylic acids, including isophthalic acid and 1,3-cyclohexanedicarboxylic acid, may be added in an amount of up to 10 mole % and other additional glycol components, such as 1,3-cyclohexanedimethanol, may be added in an amount of up to 10 mole %.

SUMMARY OF THE INVENTION

The invention answers the problems connected with previous binder fibers and copolyesters by providing binder fiber copolyesters having excellent color, thermoplastic flow and increased bonding versatility as well as catalysts for producing such copolyesters. The copolyesters of the invention are suitable for use in a wide variety of applications, such as binder fibers for making nonwoven fabrics and textile and industrial yarns.

More specifically, the invention provides copolyesters which are prepared with glycol components and dicarboxylic acid components. The glycol component generally contains 1,3- or 1,4-cyclohexanedimethanol in an amount ranging from about 5 to 50 mole % and ethylene glycol in an amount ranging from about 50 to about 95 mole %. The dicarboxylic acid component generally contains isophthalic acid or esters thereof in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof. The copolyester of the invention is formed such that the resulting copolyesters have inherent viscosities of less than about 0.7 and excellent thermoplastic flow and bonding capability. Indeed, the copolyesters of the invention are particularly suited for use as binder fibers because the copolyesters possess a lower I.V. which allows improved bonding of the binder fiber for nonwoven fabrics at relatively low temperatures. The invention is discussed in more detail below.

DETAILED DESCRIPTION OF THE INVENTION

The invention relates to binder fibers made from copolyesters and the copolyesters themselves. The copolyesters of the invention possess excellent color as they are clearer, exhibit a neutral hue or brighter appearance than previous copolyesters and may accept dyes more easily than higher I.V. copolyesters. Indeed, through the use of a lower I.V., a copolyester polymer is formed which is clear and non opaque and may readily be processed into binder fibers having excellent binding properties. Furthermore, the processing of the copolyesters into binder fibers is aided by the lower melt spinning temperatures of the lowered I.V. copolyesters of the invention.

The copolyesters of the invention are formed from the reaction of a glycol component and a dicarboxylic acid component. Generally, the glycol component comprises 1,3- or 1,4-cyclohexanedimethanol in an amount ranging from about 5 to about 50 mole % and ethylene glycol in an amount ranging from about 50 to about 95 mole %. The dicarboxylic acid component contains isophthalic acid in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof. As to the cyclohexanedicarboxylic acid, the 1,4-cyclohexanedicarboxylic acid is preferred. The copolyesters of the invention possess an I.V. of between about 0.4 to about 0.7. These features and others are discussed in more detail below.

Glycol Component

As mentioned above, the glycol component generally comprises 1,3- or 1,4-cyclohexanedimethanol in an amount ranging from about 5 to about 50 mole % and ethylene glycol in an amount ranging from about 50 to about 95 mole %. Preferably the 1,3- or 1,4-cyclohexanedimethanol is present in an amount ranging from about 5 to about 35 mole %, more preferably about 8 to about 30 mole %. The 1,3- or 1,4-cyclohexanedimethanol may be a cis-, trans-, or cis/trans mixture of isomers with the 1,4-cyclohexanedimethanol being preferred. The ethylene glycol is preferably present in an amount ranging from about 65 to about 95 mole % and more preferably about 70 to about 92 mole %.

In addition to the 1,3- or 1,4-cyclohexanedimethanol and ethylene glycol, the glycol component may include up to about 10 mole % of conventional glycols including, but not limited to, glycols containing about 3 to about 12 carbon atoms such as propylene glycol, diethylene glycol, 1,3-propanediol, 1,4-butanediol, 1,5-pentanediol, 2,2-dimethyl-1,3-propanediol, 1,6-hexanediol, 2,2,4-trimethyl-1,3-propanediol, 2-ethyl-2-butyl-1,3-propanediol, 2,2,4,4-tetramethyl 1,3 cyclobutanediol, 2,4-dimethyl-2-ethylhexane-1,3-diol, 2-ethyl-2-isobutyl-1,3-propanediol, 1,3-butanediol, 1,8-octanediol, 2,2,4-trimethyl-1,6-hexanediol, thiodiethanol, and 1,2-cyclohexanedimethanol.

Dicarboxylic Acid Component

The dicarboxylic acid component contains isophthalic acid or esters thereof in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof. It should be noted that any of the naphthalenedicarboxylic acid isomers or mixtures of isomers may be used with the 1,4-, 1,5-, 2,6- and 2,7- isomers being preferred. Additionally, the 1,3- or 1,4-cyclohexanedicarboxylic acid moieties may be as the cis-, trans- or cis/trans mixtures of isomers. Depending upon the equipment used, the preferred dicarboxylic acid component contains either isophthalic acid and terephthalic acid or isophthalic acid and dimethyl terephthalate or dimethyl isophthalate and dimethyl terephthalate.

Additional dicarboxylic acid components, (other than acids or esters of isophthalic acid, terephthalic acid, naphthalenedicarboxylic acid, and 1,3- or 1,4-cyclohexanedicarboxylic acid), may be added in amounts of up to about 10 mole %. Suitable additional dicarboxylic acid components contain about 4 to about 40 carbon atoms and are described in U.S. Pat. Nos. 5,608,031 and 5,668,243, herein incorporated by reference in their entirety. Preferably the additional dicarboxylic acid component is an acid or ester of an aromatic dicarboxylic acid, preferably having 8 to 14 carbon atoms, an aliphatic dicarboxylic acid, preferably having 4 to 12 carbon atoms, or a cycloaliphatic dicarboxylic acid, preferably having 8 to 12 carbon atoms.

Particularly preferred examples of additional dicarboxylic acid components other than isophthalic acid, terephthalic acid, naphthalenedicarboxylic acid, and 1,3- or 1,4-cyclohexanedicarboxylic acid to be used include, but are not limited to, sulfoisophthalic acid, 1,4-cyclohexanediacetic acid, diphenyl-4,4'-dicarboxylic acid, succinic acid, glutaric acid, adipic acid, azelaic acid, sebacic acid, 1,12-dodecanedioc acid and dimer acid. Copolyesters may be prepared from one or more of the above dicarboxylic acids.

Branching Agents

Small amounts, typically less than about 2 mole %, of conventional branching agents may be reacted with the glycol component and dicarboxylic acid component to form the inventive copolyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, and pentaerythritol.

Reaction Process for Forming the Copolyesters

In forming the copolyesters of the invention, the reaction of the glycol component and the dicarboxylic acid component may be carried out using conventional polyester polymerization conditions. For example, when preparing the copolyesters by means of an ester interchange reaction, i.e., from the ester form of the dicarboxylic acid components, the reaction process may comprise two steps. In the first step, the glycol component and the dicarboxylic acid component, such as, for example, dimethyl isophthalate and dimethyl terephthalate, are reacted at elevated temperatures, typically, about 180° C. to about 280° C. and pressures ranging from about 0.0 to about 60 psig. Preferably, the temperature for the ester interchange reaction ranges from about 190° C. to about 240° C. while the preferred pressure ranges from about 15 psig to about 40 psig. Thereafter, the reaction product is heated under still higher temperatures and under reduced pressure to form polyester with the elimination of glycol, which is readily volatilized under these conditions and removed from the system. This second step, or polycondensation step, is continued under higher vacuum and a temperature which generally ranges from about 240° C. to about 300° C., preferably about 250° C. to about 290° C. and most preferably about 270° to about 285° C., until a polymer having the desired degree of polymerization, determined by I.V., is obtained. The polycondensation step may be conducted under reduced pressure which ranges from about 400 mm Hg (torr) to about 0.1 mm Hg (torr). Without the aid of a suitable catalyst, the above reactions do not proceed at a noticeable rate.

To ensure that the reaction of the glycol component and dicarboxylic acid component by an ester interchange reaction mechanism is driven to completion, it is preferred to employ 3 moles and more preferably about 2.3 to about 2.6 moles of glycol component to one mole dicarboxylic acid component. It being understood, however, that the ratio of glycol component to dicarboxylic acid component is generally determined by the design of the reactor in which the reaction process occurs.

In the preparation of polyester by direct esterification, i.e., from the acid form of the dicarboxylic acid component, copolyesters are produced by reacting isophthalic acid, and at least one dicarboxylic acid selected from terephthalic acid, naphthalenedicarboxylic acid, and 1,3- or 1,4-cyclohexanedicarboxylic acid with the glycol component. The reaction is conducted at a pressure of from about 1 to about 200 pounds per square inch gauge pressure, preferably less than 100 psig to produce a low molecular weight, linear or branched polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

To ensure that the reaction of the glycol component and dicarboxylic acid component by a direct esterification reaction mechanism is driven to completion, it is preferred to employ about 3.0 to 1.05 moles glycol component to one mole dicarboxylic acid component. It being understood, however, that the ratio of glycol component to dicarboxylic acid component will be determined by the design of the reactor in which the reaction process occurs.

Lower I.V. copolyesters are generally obtained by employing shorter residence times or slow reaction rates as compared to processes for forming higher I.V. copolyesters. For example, the reaction rate can be slowed by reducing the reaction temperature, reducing the catalyst concentration, by increasing the absolute pressure in the reactor or by a combination of these factors.

The process of forming the copolyesters of the invention may be conducted as a batch, semi-batch or continuous process. Advantageously the process is operated as a continuous process. Indeed, it is possible to produce superior coloration of the copolyester when using a continuous process as the copolyester may deteriorate in appearance if the copolyester is allowed to reside in a reactor at an elevated temperature for too long a duration.

Catalyst System

A variety of catalyst systems are useful in promoting the reaction of the glycol component and the dicarboxylic acid component. Typically a catalyst system will contain catalytic materials and catalytic inhibitors.

Catalytic Materials

Catalytic materials which are suitable for the catalyst system include, but are not limited to, materials containing titanium, manganese, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243, and 5,681,918, herein incorporated by reference in their entirety. Generally, the catalyst system of the invention comprises materials which contain titanium, manganese and/or zinc and mixtures thereof. While the amounts of the individual catalytic materials in the catalyst system will vary, it is desired that the total amount of catalytic materials in the catalyst system be below about 125 ppm, preferably below about 100 ppm and most preferably below about 80 ppm. The "ppm" for the catalyst system and the catalytic inhibitor described below, refers to the weight of the element referred to and is based upon the weight of the final copolyester product.

While titanium catalytic materials may be added in the form of complexed materials such as those described in U.S. Pat. No. 5,017,680, the titanium catalytic materials are preferably added in the form of an alkoxide in an amount ranging from about 10 to about 35 ppm, more preferably about 10 to about 25 and most preferably about 12 to about 20 ppm. Indeed, copolyesters formed with lower levels of titanium catalytic materials have better stability when held in the melt. Suitable titanium alkoxides include, but are not limited to, acetyl triisopropyl titanate, tetraisopropyl titanate and tetraisobutyl titanate. Particularly preferred titanium catalytic materials include acetyl triisopropyl titanate and tetraisopropyl titanate. The titanium catalytic material may be added to the reaction process prior to direct esterification or ester interchange reaction or prior to the polycondensation reaction.

Manganese is typically added in the form of a salt, such as an organic acid salt in an amount ranging from about 0 to 70 ppm, preferably about 20 to about 70 ppm, more preferably about 30 to about 70 ppm and most preferably about 40 to about 70 ppm. Examples of suitable manganese salts include, but are not limited to, manganous benzoate tetrahydrate, manganese chloride, manganese oxide, manganese acetate, manganese acetylacetonate, and manganese succinate. Manganese is added to the reaction process prior to a direct esterification or ester interchange reaction.

Zinc may be added to the catalyst system in addition to the manganese or in place of the manganese catalyst. Zinc is typically added in the form of a salt in an amount ranging from 0 to 100 ppm, preferably about 25 to about 100 ppm and more preferably about 50 to about 80 ppm. Examples of suitable zinc compounds include, but are not limited to, zinc acetate, zinc succinate, and zinc alkoxide. Zinc is typically added to the reaction process prior to an ester interchange reaction.

If desired, a cobalt catalytic material, may also be employed as part of the catalyst system. When employed, cobalt is typically added in the form of a salt, such as an organic acid salt. Examples of suitable cobalt salts include, but are not limited to, cobaltous acetate trihydrate, cobaltous nitrate, cobaltous chloride, cobalt acetylacetonate, cobalt naphthenate, and cobalt salicylate. Cobalt may be added in an amount up to about 100 ppm, more preferably up to about 90 ppm. As described below, the cobalt may function as both a catalytic material and as a colorant. As a colorant, cobalt is generally added to the reaction process after a direct esterification or ester interchange reaction. As cobalt is generally used as a colorant, the amount of cobalt is not considered when calculating the total amount of catalytic material.

In some embodiments antimony may be employed. When used, examples of suitable antimony compounds include, but are not limited to, antimonate esters of inorganic acids, antimony oxide, antimony alkoxides such as antimony isopropoxide, antimony halide, such as antimony chloride, antimony bromide and antimony fluoride, sodium or potassium antimonate, antimony carboxylates, such as antimony acetate and antimony glycolate or mixtures thereof. Preferably the antimony component is an antimony glycolate or an antimony oxide. Antimony is generally added after the ester interchange or a direct esterification reaction. When the copolyester is used to form binder fibers, antimony may be omitted from the catalyst system due to deposit buildup on the spinnerette face caused by the presence of an antimony containing catalyst.

While less preferred, calcium, gallium and silicon catalytic materials may be used in the catalyst system. Examples of suitable calcium compounds include, but are not limited to, calcium acetate, calcium glycoxide, and calcium phosphate monohydrate. Examples of suitable gallium compounds include, but are not limited to, gallium chloride, gallium nitrate hydrate, gallium oxide, gallium lactate and gallium phosphide. Examples of suitable silicon compounds include, but are not limited to, silicon acetate and tetraethyl orthosilicate. Germanium catalytic materials include, but are not limited to oxides, organic salts and in particular glycolates of germanium.

A preferred ester interchange catalyst system for reacting dimethyl isophthalate and esters of terephthalic acid, naphthalenedicarboxylic acid, and 1,3- or 1,4-cyclohexanedicarboxylic acid with glycols contains titanium, manganese, and optionally cobalt, materials. In the ester interchange catalyst system, the titanium is present in an amount ranging from about 10 to about 35 ppm, preferably about 10 to about 25 ppm and the manganese is present in an amount ranging from about 30 to about 70 ppm. Additionally, in another embodiment of the ester catalyst system, the total amount of catalytic materials in the catalyst system is less than or equal to about 125 ppm, preferably less than about 100 ppm, more preferably less than about 80 ppm and most preferably less than 70 ppm. A preferred ester catalyst system is typically used in combination with a catalytic inhibitor comprising about 40 to about 90 ppm phosphorus; and a colorant in an effective amount, for example, about 2 to about 10 ppm of a blue and/or red substituted anthraquinone dye. Generally, the preferred ester interchange catalyst system is substantially free of zinc catalytic materials, more preferably contains less than 5 ppm zinc catalytic materials and most preferably is free of zinc catalytic materials. Additionally, when binder fibers are desired, the preferred ester catalyst system is substantially free of antimony catalytic materials, more preferably contains less than 5 ppm antimony catalytic materials and most preferably is free of antimony catalytic materials.

Catalytic Inhibitor

To stabilize the effects of the catalyst system and to promote efficiency of zinc, manganese and cobalt catalytic materials, it is desirable to add a phosphorus catalytic inhibitor to the reaction process after an ester interchange or direct esterification reaction but prior to conducting the polycondensation reaction step. Typically, phosphorus is added in the formn of a phosphate, such as phosphoric acid or an organic phosphate ester in an amount ranging from about 40 to 90 ppm and more preferably ranging from about 60 to 75 ppm. Suitable phosphate esters for use in this invention include, but are not limited to, ethyl acid phosphate, diethyl acid phosphate, triethyl phosphate, arylalkyl phosphates and tris-2-ethylhexyl phosphate. One useful phosphate catalytic inhibitor is sold under the Merpol® A tradename which is commercially available from Du Pont.

Colorants

In forming the copolyesters of the invention, colorants, sometimes referred to as toners, may be added to impart a desired neutral hue and/or brightness to the resulting copolyester. When colored copolyesters are desired, pigments or colorants may be included in the reaction mixture during the reaction of the glycol component and the dicarboxylic acid component or they may be melt blended with the preformed copolyester. A preferred method of including colorants is to use a colorant having thermally stable organic colored compounds having reactive groups such that the colorant is copolymerized and incorporated into the copolyester to improve the hue of the copolyester. For example, colorants such as dyes possessing reactive hydroxyl and/or carboxyl groups, including, but not limited to, blue and red substituted anthraquinones, may be copolymerized into the polymer chain. Colorants and dyes are described in detail in U.S. Pat. Nos. 4,521,556, 4,740,581, 4,749,772, 4,749,773, 4,749,774, 4,950,732, 5,384,377, 5,372,864, 5,340,910 and 5,681,918, herein incorporated by reference in their entirety. When dyes are employed as colorants, they may be added to the copolyester reaction process after an ester interchange or direct esterification reaction. Furthermore, when a dye or dye mixture is employed as the toner colorant for the copolyester, it is preferred that the total amount of dye is less than 10 ppm.

Alternatively, inorganic pigments, such as titanium dioxide and cobalt containing materials, may be added to the reaction. Advantageously when a catalyst material contains cobalt, the cobalt may also act as a colorant. Care must be taken to control the level of cobalt in order to avoid opacity and dinginess in the copolyesters of the invention. To control the level of opacity and dinginess, cobalt may be employed in an amount ranging up to about 90 ppm.

Copolyesters of the Invention

The copolyesters of the invention have an inherent viscosity, I.V., ranging from about 0.40 to 0.70. Preferably the copolyesters of the invention have an I.V. ranging from about 0.40 to about 0.66, more preferably 0.42 to about 0.65 and most preferably about 0.45 to about 0.58. The I.V. of the copolyesters of the invention is determined by measuring the I.V. at 25° C. using 0.5 g polymer per 100 mL of a solvent consisting of 60% by weight phenol and 40% by weight tetrachloroethane. The basic method of determining the I.V. of a copolyester is set forth in ASTM D-2857-70. The copolyesters produced with the lower I.V. values possess excellent color as they are clearer than previous copolyesters and may accept dyes more easily than higher I.V. copolyesters. Furthermore, low I.V. copolyesters are more easily dyed at lower temperatures and possibly more easily printed than similar higher I.V. copolyesters. Additionally, since the copolyesters of the invention have low I.V. values, the production rates of the copolyesters are quite rapid.

Fibers formed from the inventive copolyesters are easier to dye and are deeper dyeing as compared to polyethylene terephthalate homopolymers when employing the same aqueous dyeing conditions. Indeed, dyeing of the inventive copolyesters to a deeper depth of shade is possible when employing similar dyeing conditions. Conversely, the same depths of shade can be achieved with lower dyeing costs as compared to the dyeing of polyethylene terephthalate homopolymers.

The polymerization of 1,3- or 1,4-cyclohexanedimethanol, ethylene glycol, terephthalic acid and isophthalic acid may be controlled to form either crystalline or amorphous polyethylene terephthalate copolyesters with glass transition temperatures similar or slightly lower than polyethylene terephthalate. The selection and amount of the dicarboxylic acid components and the glycol components will generally determine if the resulting copolyester is amorphous or crystalline. As is known in the art, amorphous polymers generally have higher clarity and are not opaque like many crystalline polymers. Therefore, while some of the 1,3- or 1,4-cyclohexanedimethanol and isophthalic acid levels employed may form crystalline copolyesters, the superior clarity of amorphous polyesters provides some distinct advantages.

Generally, a lower I.V. copolyester will have a lower extrusion temperature. Hence, copolyesters of the invention may advantageously be melt spun into fibers at a lower temperature. For example an isophthalic copolyester of the invention with an I.V. of 0.47 may be melt spun at a temperature of approximately about 235° C. whereas a similar non-isophthalic containing copolyester with an I.V. of 0.6 to 0.7 generally requires fiber spinning at a temperature of 275–285° C. Typically, a copolyester of the invention is melt spun at a temperature of less than about 265° C., in some cases as low as about 235° C. These copolyesters can be melt spun through a spinnerette with about 332 holes and a hole size of about 0.55 mm. Generally, the melt spinning pressures will vary from about 1000 psig to 2000 psig.

Typically, the clarity and color (hue) of the copolyesters may be evaluated using a standard spectrocolorimeter. For example, a suitable spectrocolorimeter for evaluating the clarity and color of the copolyester is a HunterLab UltraScan which is commercially available from HunterLab of Reston, Virginia. Through the use of a HunterLab UltraScan spectrocolorimeter, the clarity and color, i.e., yellowness and/or blueness may be quantified. The use of a HunterLab UltraScan spectrocolorimeter for evaluating and quantifying the color and clarity of a copolyester is described in U.S. Pat. No. 5,681,918, herein incorporated by reference in its entirety. When using the HunterLab UltraScan an L★ value indicates the level of clarity with higher L★ values representing higher levels of clarity. The level of yellowness and/or blueness is quantified as a b★ value with 0.0 representing neutral, whereas values above 0.0 indicate levels of yellowness and values below 0.0 indicate the level of blueness in the copolyester. The copolyesters of the invention typically have an L★ value of more than about 65 and a b★ value varying from between about −2.5 to about +2.5.

Products Formed from Copolyesters of the Invention

The copolyesters of the invention may be used to form an article of manufacture or be used as an additive, such as a compounding additive concentrate or master batch for another polymer system. In addition, binder fibers and other articles may be formed with the copolyesters that include, but are not limited to, automotive and structural preforms containing glass, polyester or other fibers, molded parts, sheeting and extruded films and fibers. The inventive copolyesters may be part of the articles to be formed or may form the entire article.

Conventional additives may be added to the copolyesters of the invention, depending upon the desired end use of the copolyester. Suitable additives for the copolyesters are described in detail in U.S. Pat. Nos. 5,608,031 and 5,773,554 herein incorporated by reference in its entirety. Typical additives for the copolyesters include pigments, antioxidants, stabilizers, flame retardants, tougheners, epoxy compounds, mold release agents, nucleating agents, free radical stabilizers, lubricants, and other processing agents.

A preferred article of the invention is a fiber. The fiber may be prepared in any desired length known in the art and generally in the form of a continuous filament or staple fiber. Fibers may be made from the copolyesters of the invention through any conventional means available including, but not limited to, melt spinning and melt blowing. Depending upon the end use, any desired denier may be formed with the fibers employing copolyesters of the invention, including fibers having a denier value ranging from microdenier to about 50 denier, preferably up to about 20 denier, most preferably about 1.5 to about 15 denier.

The copolyesters may be used to form binder fibers in any desired configuration known in the art. The copolyesters of the invention are preferably binder fibers having the form of a fibrous structure. A major advantage of binder fibers is that bonded products containing the binder fibers can be obtained by applying heat, radio frequencies or ultrasonic frequencies to a web or unbonded batt of filaments. Upon activation the copolyester softens and flows and upon cooling forms a solid bond with neighboring fibers. Indeed, the copolyesters of the invention are particularly suited for use as binder fibers as the copolyesters possess a lower I.V. which allows better flow and softening properties at lower temperatures. Hence, improved bonding of the binder fiber is possible at lower temperatures than previously known binder fibers for nonwoven fabrics when employing binder fibers containing the copolyesters of the invention. Indeed, the binder fibers formed from the copolyesters of the invention are particularly suited for bonding to polyester, acrylic, nylon, glass, cellulosic fibers, such as cotton and pulp-based fibers, and scoured wool. Typically, the binder fibers formed with the copolyesters of the invention will have deniers of about 1.5 to about 20. However, other fibrous forms such as melt blown webs or spunbonded materials may have microdenier sizes.

The binder fibers of the invention may be in the form of unicomponent or bicomponent binder fibers. Shaped binder fibers may be formed with the cross-sectional legs capped with binder materials during extrusion.

Bicomponent binder fibers may have a sheath/core, side by side, or other configuration known in the art. The process of preparing and bonding a low melt temperature bicomponent binder fiber is described in detail in U.S. Pat. No. 3,589,956, herein incorporated by reference in its entirety. In a bicomponent fiber of the invention, the copolyesters of this invention will be present in amounts of about 10 to about 75 weight % of the bicomponent fiber. The other component may be from a wide range of other polymeric materials including, but not limited to, polyesters such as polyethylene terephthalate or polybutylene terephthalate. Bicomponent binder fibers may be blended with other fibers or used alone to make nonwoven fabrics and high loft battings having various properties. Generally, bicomponent binder fibers contain a polymer having a high melting point to ensure structural integrity during the bonding process and a lower melting or amorphous polymer to bond the matrix in nonwoven fabrics. Alternatively, economics may dictate that a much less expensive core material be used.

Binder fibers from this invention are readily blended with a wide range of other fibers and subsequently heat or energy activated to provide nonwoven fabrics having good integrity and strength. For example, other fibers in the blends could include, but are not limited to, polyester, acrylic, nylon, glass, cellulosic (cotton, pulp-based fibers, cellulose ester fibers etc.) and other similar fibers. Incorporation in non-wovens can also aid lamination to other fabrics, films and some metallic surfaces. The amount of binder fiber in the nonwoven blend will generally be in the range of about 5 to about 30 weight %, although amounts as little as 2 weight % can also be used. In some instances fabrics are formed using 100% binder fibers.

Another fibrous structure which may be made with the copolyesters of the invention is a fiber which is formed by melt blending less than about 50% of the inventive copolyester with a polyolefin or a functionalized polyolefin. When melt blending, suitable compatibilizers may be employed for their desired effects. The melt blended copolyester/polyolefin may be spun as a fiber to form a fibrous structure. This melt blending allows polyolefins to be spun in a natural state and dyed in separate subsequent operations, something which cannot be satisfactorily achieved with unmodified polypropylene.

The fibrous structures of the invention are particularly useful for processing into a wide variety of nonwoven, knitted and tufted textiles for a variety of application, but are particularly suitable for the manufacture of bonded, non-woven and textiles, either quilted or unquilted, which may be activated by a variety of means. They are also suitable for use in making a wide variety of products including, but not limited to, high loft battings, needle punched fabrics, flat nonwovens, hydroentangled fabrics, stitch-bonded fabric (to minimize pilling), wet-laid non-woven fabrics and paper, filter media, face masks, scatter rugs, cotton carpeting, cellulosic insulation, absorbent products, fiberglass composites, pillow fillings, fillings for sleeping bags, cushions, quilts, comforters, coverlets, mattresses, mattress pads, mattress covers, furniture and auto upholstery, bedspreads, pile fabrics for industrial and apparel uses, blankets, women's robes, sport jackets, car coats, interlinings, outerwear, floor covering materials, tiles, carpets, bath mats, foot and handwear, ribbons and molded articles.

Another suitable use for the copolyesters of the invention is as a compounding carrier material. For example, the copolyester of the invention may be mixed with additives, including colorants, to form a concentrate or masterbatch where the copolyester is a carrier material. This concentrate or masterbatch may be combined with another polymer in a later process to provide color, opacity, flame retardancy or other beneficial properties. Copolyesters of the invention will accept higher levels of additives, such as pigments, than polyethylene terephthalates of similar inherent viscosities. The copolyester may be blended or mixed by any suitable technology known in the art.

EXAMPLES

Example 1

Low Viscosity PET Copolyester Containing Isophthalic Acid and 30/70 cis/trans mixture of 1,4-cyclohexanedimethanol.

A polyethylene terephthalate (PET) copolyester containing 20 mole % isophthalic acid (IPA) and 20 mole % 1,4-cyclohexanedimethanol (CHDM) is prepared in a melt phase polycondensation using a catalyst system containing 25 ppm Ti, 40 ppm Mn, 55 ppm Co and 60 ppm P. This copolyester has an I.V. of 0.55.

Pellets of this copolyester are dried at 50° C. for 2 hours and then are melt extruded into multifilament fibers of 9 denier/filament using a spinnerette having 332 holes (0.55 mm orifice) at a take-up speed of 1000 m/m, a melt temperature of 265° C. and an extrusion rate of 43 pounds per hour. An air flow of 145 cubic feet per minute is used to quench the filaments during extrusion. The as-spun fibers are subsequently drafted in a 3:1 draft ratio and continue in a one stage drawing process using a 68° C. water bath and steam chest into which 0.5 psi live steam is injected. The fibers are stuffer box crimped to provide 7 crimps per inch and a crimp angle of 95 degrees using a clapper setting of 9.5 psi with no steam. The fiber is dried in a relaxed state at 60° C. for 2 minutes. The resultant staple fiber is 3.2 denier per filament.

The as-spun, undrawn form of the above fiber is also an effective binder fiber. For example, a 4 d/f as-spun binder fiber is especially suitable for lightweight nonwovens where low shrinkage is desirable. Similarly, beneficial results are achieved when the copolyester pellets are not dried prior to the spinning operation.

Fibers can also be readily produced from PET copolyesters formed with 12 mole % IPA and 28 mole % CHDM (I.V. 0.48) or 30 mole % IPA and 8 mole % CHDM (I.V. 0.60).

Example 2

Preparation of Nonwoven Web

A 3 denier per filament, unicomponent binder fiber from Example 1 is blended with PET staple fibers (2¼ denier per filament) to provide a blend containing 20 weight % binder fiber. The 1¼ oz/yd² intimately blended nonwoven web is formed on a carding line. The binder fibers in the nonwoven web are activated by conveying the web through an infrared oven, followed by hot nipping (80° C.) to bond the fibers to the nonwoven web. Good machine and cross direction tensile strength and drapeability are obtained. Good bonding is also obtained by passing the web from the card through an air circulating oven at 150° C. for a two minute dwell time.

Binder fibers from the compositions of this invention are also radio frequency activatable. Similarly beneficial results are achieved when the binder fiber is a 1,4-cyclohexanedicarboxylic acid (PEC) copolyester containing 15 mole % isophthalic acid and 15 mole % CHDM or a naphthalenedicarboxylic acid (PEN) copolyester containing 10 mole % isophthalic acid and 25 mole % CHDM.

Example 3

Sheath/Core Bicomponent Fiber

A 50/50 sheath/core bicomponent fiber is made using polyethylene terephthalate homopolymer (I.V. 0.54) as the core and a polyethylene terephthalate copolyester similar to that in Example 1 (I.V. 0.47) as the sheath. The bicomponent fiber is formed as follows: Crystallized, dried pellets of PET are melted in an extruder and fed as the core at a melt temperature of 288° C. Dried pellets of PET copolyester are transported to the feed hopper of the extruder feeding the sheath melt stream. The sheath stream is extruded at a melt temperature of 250° C. The molten streams are coextruded through a spinnerette having a sheath/core hole configuration at metering rates adjusted to produce fibers having a 50% copolyester sheath/50% PET core. The fibers are drawn with draw roll speeds to produce 4 denier per filament fibers.

A similar 40/60 sheath/core bicomponent fiber is also produced in filament and staple form. For staple, the fibers are then crimped and cut into 38 mm lengths.

These bicomponent binder fibers are useful in making nonwovens, composites and other formed materials when incorporated or combined with polyethylene terephthalate, glass and/or other matrix fibers, fabrics or films. For some nonwoven structures, these binder fibers can also be used in 100% form.

Example 4
Low Viscosity PET Copolyester Containing IPA and CHDM

Using the catalyst system described in Example 1, a PET copolyester containing 11 mole % IPA and 13 mole % CHDM is prepared. This copolyester has an I.V. of 0.58. Dried samples of this copolyester are melt spun using the technique described in Example 1 to provide as-spun multifilament binder fibers of 12 d/f. These fibers are drafted, crimped and cut to provide staple fibers of 3.5 d/f. These binder fibers are blended with PET fibers to form a blend containing 15 weight % binder fiber. The blend is bonded by passing it through an infrared oven as described in Example 2.

Filament fibers are also readily melt spun from the copolyester of this example to provide filaments of 6 d/f. These filaments are readily intermingled or continuously blended with glass at a 7% binder fiber level, chopped into staple or roving which is then formed into a composite structure and thermally activated.

We claim:

1. A binder fiber comprising a copolyester formed from the reaction product of:
   a glycol component with a dicarboxylic acid component,
   wherein the glycol component comprises 1,3- or 1,4-cyclohexanedimethanol in an amount ranging from about 5 to 50 mole % and ethylene glycol in an amount ranging from about 50 to about 95 mole %, wherein the dicarboxylic acid component comprises isophthalic acid or an ester thereof in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof.

2. The binder fiber of claim 1, wherein the I.V. of the copolyester ranges from 0.4 to about 0.66.

3. The binder fiber of claim 1, wherein the binder fiber may be activated by heat.

4. The binder fiber of claim 1, wherein the binder fiber may be activated by ultrasonic and radio frequencies.

5. The binder fiber of claim 1, wherein the binder fiber has a denier ranging from about 20 to microdenier sizes.

6. The binder fiber of claim 1, wherein the binder fiber has a denier ranging from about 20 to about 1.

7. The binder fiber of claim 1, wherein the binder fiber is a unicomponent binder fiber.

8. The binder fiber of claim 1, wherein the binder fiber is a bicomponent binder fiber.

9. The binder fiber of claim 1, wherein the copolyester has an L★ value of greater than about 65 and the b★ value ranges from about −2.5 to about +2.5.

10. The binder fiber of claim 1, wherein the copolyester is formed in the presence of a catalyst system comprising up to about 35 ppm Ti.

11. The binder fiber of claim 10, wherein the copolyester is formed in the presence of a catalyst system comprising about 10 to about 35 ppm Ti, about 20 to about 70 ppm Mn, about 0 to about 90 ppm Co and in the presence of a catalytic inhibitor comprising about 40 to about 90 ppm P based on the weight of the copolyester.

12. The binder fiber of claim 1, wherein the dicarboxylic acid component is an ester or mixture of esters of terephthalic acid, naphthalenedicarboxylic acid or 1,3- or 1,4-cyclohexanedicarboxylic acid.

13. A fibrous structure comprising a fiber formed by melt blending a polyolefin or a functionalized polyolefin with the binder fiber of claim 1.

14. A binder fiber comprising a copolyester formed from the reaction product of:
   a glycol component with a dicarboxylic acid component,
   wherein the glycol component comprises 1,3- or 1,4-cyclohexanedimethanol in an amount ranging from about 5 to 50 mole % and ethylene glycol in an amount ranging from about 50 to about 95 mole %, wherein the dicarboxylic acid component comprises isophthalic acid or an ester thereof in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof and wherein the copolyester has an I.V. of between about 0.4 to 0.7.

15. The binder fiber of claim 14, wherein the copolyester has an I.V. of between about 0.45 to 0.58.

16. The binder fiber of claim 14, wherein the copolyester is formed in the presence of a catalyst system comprising up to about 35 ppm Ti.

17. A copolyester formed from the reaction product of:
   a glycol component with a dicarboxylic acid component,
   wherein the glycol component comprises 1,3- or 1,4-cyclohexanedimethanol in an amount ranging from about 5 to 50 mole % and ethylene glycol in an amount ranging from about 50 to about 95 mole %, wherein the dicarboxylic acid component comprises isophthalic acid or an ester thereof in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof, and wherein the copolyester is formed in the presence of a catalyst system comprising up to about 35 ppm Ti.

18. The copolyester of claim 17, wherein the copolyester is formed in the presence of a catalyst system comprising about 10 to about 35 ppm Ti, about 20 to about 70 ppm Mn, about 0 to about 90 ppm Co and in the presence of a catalytic inhibitor comprising about 40 to about 90 ppm P based on the weight of the copolyester.

19. The copolyester of claim 17, wherein the copolyester has an L★ value of greater than about 65 and the b★ value ranges from about −2.5 to about +2.5.

20. The copolyester of claim 17, wherein the copolyester is melt blended with a polyolefin or functionalized polyolefin.

21. The copolyester of claim 17, wherein the copolyester accepts higher concentrations of additives than a polyethylene terephthalate polymer having the same I.V.

22. A fiber formed from the copolyester of claim 17, wherein the fiber is dyed to a deeper shade than a polyethylene terephthalate fiber.

* * * * *

UNITED STATES PATENT AND TRADEMARK OFFICE
CERTIFICATE OF CORRECTION

PATENT NO : 6,132,868
DATED : October 17, 2000
INVENTOR(S) : Leron R. DEAN et al.

It is certified that error appears in the above-identified patent and that said Letters Patent is hereby corrected as shown below:

Column 4, lines 4-5, "2,24-trimethyl-1,3-propanediol" should be --2,2,4-trimethyl-1,3-pentanediol--.

Column 8, line 4, "Catalvtic" should be --Catalytic--.

Signed and Sealed this

Fifteenth Day of May, 2001

Attest:

NICHOLAS P. GODICI

*Attesting Officer*     *Acting Director of the United States Patent and Trademark Office*